United States Patent
Inamura

(10) Patent No.: US 8,818,599 B2
(45) Date of Patent: Aug. 26, 2014

(54) CONTROL APPARATUS FOR ELECTRIC ROTATING MACHINE

(71) Applicant: Denso Corporation, Kariya (JP)

(72) Inventor: Hiroshi Inamura, Kariya (JP)

(73) Assignee: Denso Corporation, Kariya (JP)

(*) Notice: Subject to any disclaimer, the term of this patent is extended or adjusted under 35 U.S.C. 154(b) by 4 days.

(21) Appl. No.: 13/706,688

(22) Filed: Dec. 6, 2012

(65) Prior Publication Data
US 2013/0151051 A1 Jun. 13, 2013

(30) Foreign Application Priority Data

Dec. 7, 2011 (JP) ................................. 2011-267689

(51) Int. Cl.
*B60W 20/00* (2006.01)
*B60W 10/06* (2006.01)
*B60W 10/08* (2006.01)

(52) U.S. Cl.
USPC .......................... 701/22; 180/65.265; 903/930

(58) Field of Classification Search
CPC ...... B60W 20/00; B60W 10/06; B60W 10/08
USPC ....................................... 701/22; 180/65.265
See application file for complete search history.

(56) References Cited

U.S. PATENT DOCUMENTS

| 5,193,503 A * | 3/1993 | Bornmann et al. ...... 123/339.14 |
| 6,330,498 B2 * | 12/2001 | Tamagawa et al. ............. 701/22 |
| 6,747,884 B2 * | 6/2004 | Nishizawa et al. ........... 363/132 |
| 7,836,987 B2 * | 11/2010 | Aoki ........................ 180/65.265 |
| 2007/0181356 A1 * | 8/2007 | Ando et al. ................... 180/65.4 |
| 2007/0290650 A1 | 12/2007 | Muta |
| 2009/0066283 A1 * | 3/2009 | Son et al. ...................... 318/473 |
| 2010/0026222 A1 * | 2/2010 | Yoshida et al. ........... 318/400.22 |
| 2011/0143245 A1 * | 6/2011 | Kawasaki et al. ............. 429/429 |

FOREIGN PATENT DOCUMENTS

JP 2006-211886 8/2006

* cited by examiner

*Primary Examiner* — Calvin Cheung
*Assistant Examiner* — Martin Weeks
(74) *Attorney, Agent, or Firm* — Nixon & Vanderhye PC

(57) ABSTRACT

The control apparatus is for an electric rotating machine which is mounted as an engine on a vehicle together with a power conversion circuit to be connected to the electric rotating machine, and a cooling apparatus for circulating coolant to the electric rotating machine and the power conversion circuit through a circulation channel, including. The control apparatus includes a limiting means for performing a limiting operation to limit an amount of electric power supply from the inverter to the electric rotating machine each time a circulation starting timing of the coolant comes, and a terminating means for terminating the limiting operation after a lapse of a predefined period from start of the limiting operation.

11 Claims, 7 Drawing Sheets

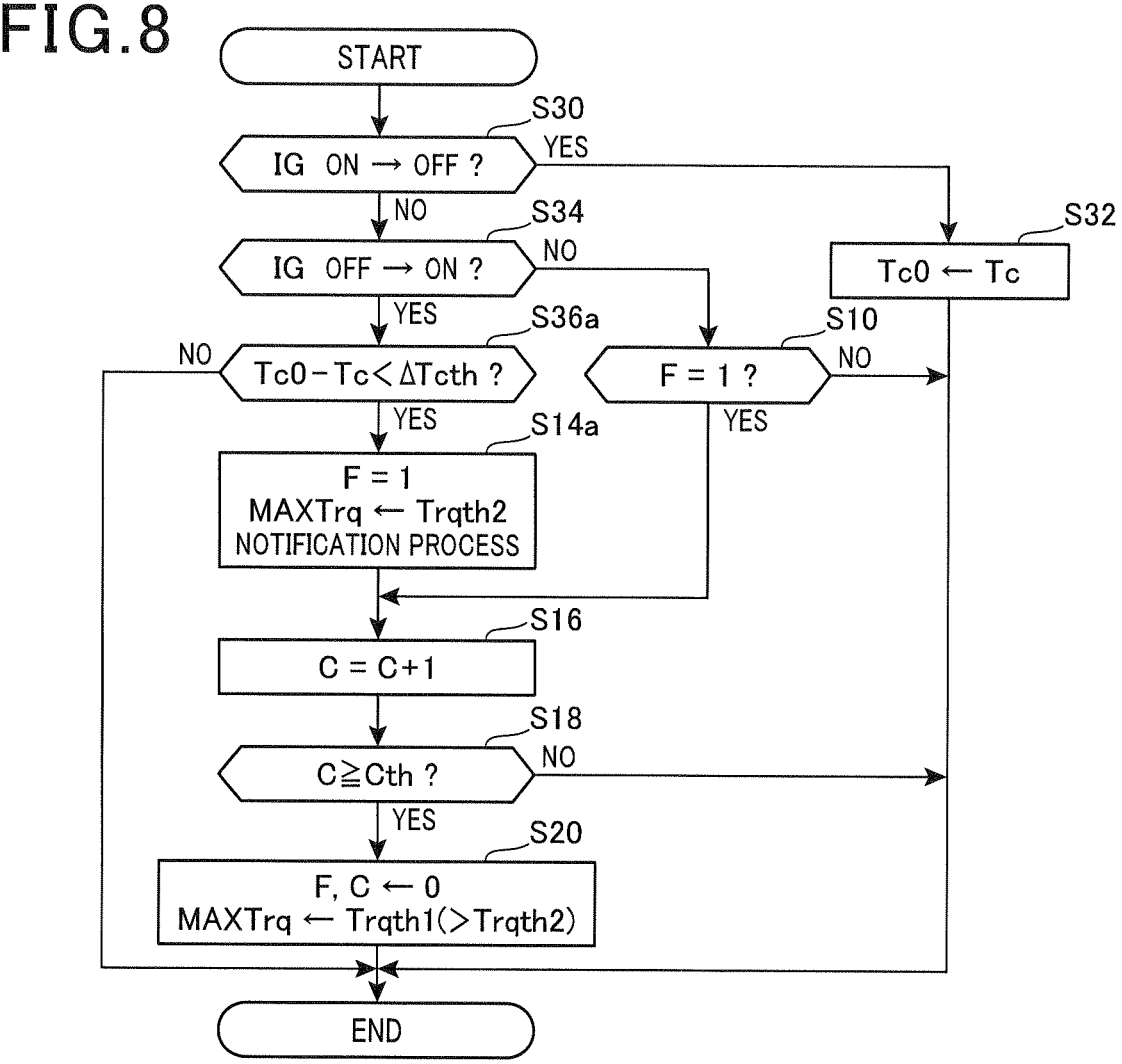

CONTROL APPARATUS FOR ELECTRIC ROTATING MACHINE

This application claims priority to Japanese Patent Application No. 2011-267689 filed on Dec. 7, 2011, the entire contents of which are hereby incorporated by reference.

BACKGROUND OF THE INVENTION

1. Field of the Invention

The present invention relates to a control apparatus for an electric rotating machine which is mounted as a main engine on a vehicle together with a power conversion circuit to be connected to the electric rotating machine, and a cooling apparatus for circulating coolant to the electric rotating machine and the power conversion circuit through a circulation channel.

2. Description of Related Art

As described, for example, in Japanese Patent Application Laid-open No. 2006-211886, there is known a torque-limiting device for limiting the torque of a motor when the temperature of an inverter connected as a power conversion circuit to the motor is high. The torque-limiting device enables to reduce an amount of heat generation of switching elements included in the inverter to prevent the temperature of the inverter from further increasing.

However, for the torque-limiting device to operate, it is necessary to provide a data transmitting means for transmitting data indicative of the temperature of the inverter to a control apparatus. When the inverter is mounted on a vehicle, the data transmitting means has to include an insulating means such as photocouplers and a signal processing means for modulating the data to signals appropriate to be transmitted through the insulating means, because the reference potential of the vehicle-mounted inverter is different from that of the control apparatus which manipulates the vehicle-mounted inverter.

Meanwhile, if a cooling apparatus for the inverter has a large enough capacity to keep the temperature of the inverter below a certain temperature below which it is not necessary to limit the torque of the motor in normal operation, it does not necessarily have to transmit the temperature data of the inverter to the control apparatus. However, even in this case, the temperature of the inverter may increase excessively immediately after the cooling apparatus starts to circulate the coolant.

If the capacity of the cooling apparatus is increased to address such a problem, the size and electricity consumption of the inverter may increase beyond tolerable levels.

SUMMARY

An exemplary embodiment provides a control apparatus for an electric rotating machine which is mounted as an engine on a vehicle together with a power conversion circuit to be connected to the electric rotating machine, and a cooling apparatus for circulating coolant to the electric rotating machine and the power conversion circuit through a circulation channel, including:

a limiting means for performing a limiting operation to limit an amount of electric power supply from the inverter to the electric rotating machine each time a circulation starting timing of the coolant comes; and a terminating means for terminating the limiting operation after a lapse of a predefined period from start of the limiting operation.

According to the exemplary embodiment, it is possible to cool an electric rotating machine which is mounted as a main engine on a vehicle and a power conversion circuit to be connected to the electric rotating machine using a cooling apparatus which is small in size and electric power consumption.

Other advantages and features of the invention will become apparent from the following description including the drawings and claims.

BRIEF DESCRIPTION OF THE DRAWINGS

In the accompanying drawings:

FIG. 8 is a flowchart showing steps of a torque limiting process performed by a control apparatus according to a fifth embodiment of the invention; and FIG. 9 is a flowchart showing steps of a torque limiting process performed by a control apparatus according to a sixth embodiment of the invention.

PREFERRED EMBODIMENTS OF THE INVENTION

First Embodiment

Figure 1:
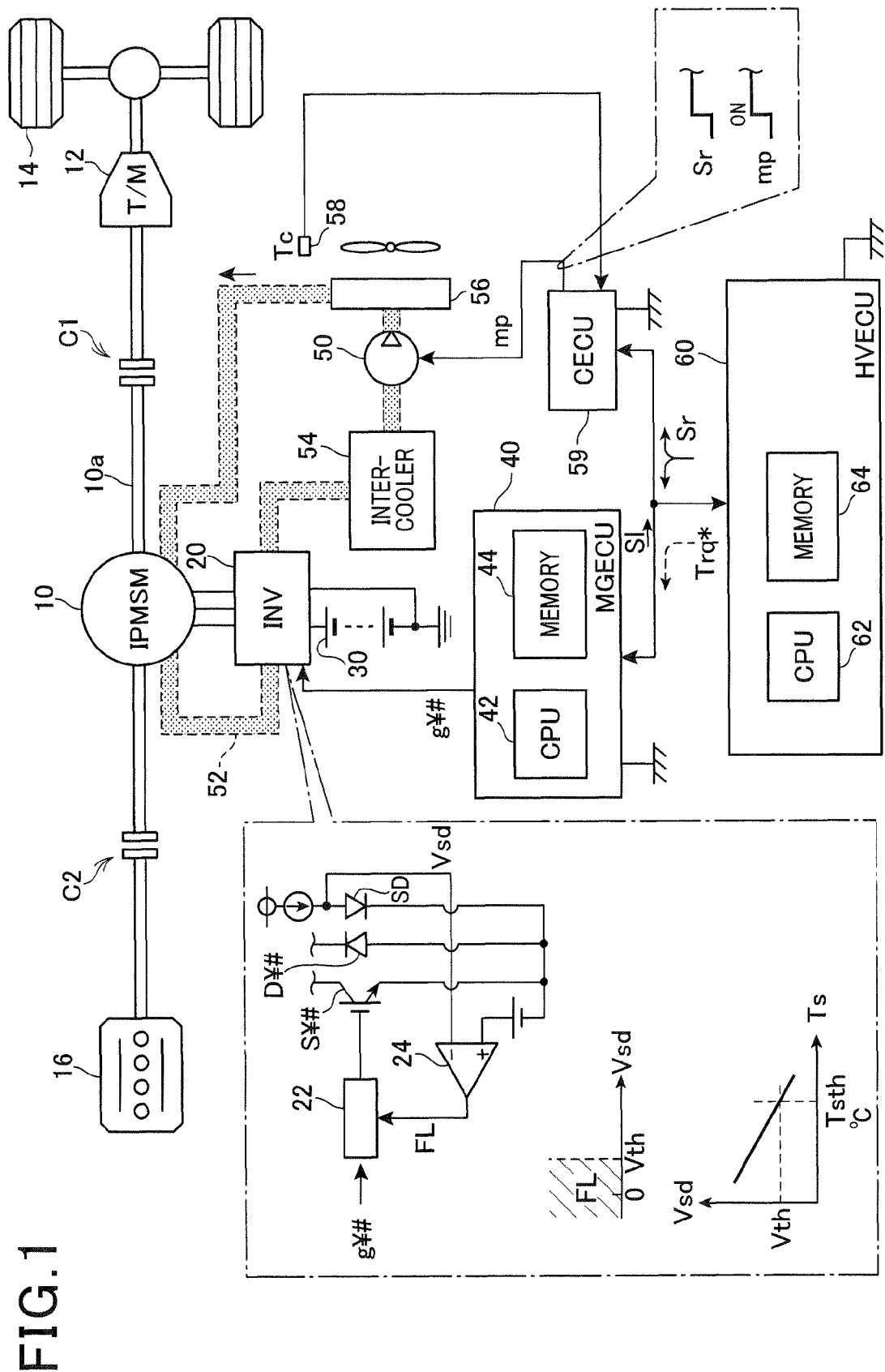
FIG. 1 is a diagram showing a structure of a drive system of a vehicle including a motor-generator as a main engine of the vehicle and a control apparatus according to a first embodiment of the invention.

FIG. 1 is a diagram showing a structure of a drive system of a parallel hybrid vehicle including a motor-generator 10 as an electric rotating machine which serves as a main engine of the vehicle, and an MGECU (Motor-Generator ECU) 40 which serves as a control apparatus according to a first embodiment of the invention.

As shown in FIG. 1, the motor-generator 10, which is a three-phase electric rotating machine capable of operating as both a motor and an alternator, is mechanically coupled to drive wheels 14. More specifically, the rotating shaft 10a of the motor-generator 10 is mechanically coupled to the drive wheels 14 through an electronic-controlled clutch C1 and a transmission 12 which may be a CVT (Continuously Variable Transmission). In this embodiment, the motor-generator 10 is an IPMSM (Interior Permanent Magnet Synchronous Motor)

The rotating shaft 10a of the motor-generator 10 is mechanically coupled further to an internal combustion engine 16 through an electronic-controlled clutch C2.

The motor-generator 10 is supplied with electric power from a high-voltage battery 30 whose open terminal voltage exceeds 100 V through an inverter 20 as a power conversion circuit. The inverter 20 includes switching elements S¥p(¥=u, v,w) for making connection between the positive terminal of the high-voltage battery 30 and the terminals of the motor-generator 10, and a switching element SY̶n for making connection between the negative terminal of the high-voltage battery 30 and the terminals of the motor-generator 10. In this embodiment, these switching elements SY̶#(Y̶=u,v,w; #=p,n) are insulated gate bipolar transistors which are inversely parallel-connected with diodes DY̶#, respectively.

The open/close control terminals (gates) of the switching elements SY̶# are connected to a driver circuit 22. The driver circuit 22 receives on-manipulation commands and off-manipulation commands from outside to turn on and off the switching elements SY̶# (referred to as "manipulation signals gY̶#" hereinafter). The driver circuit 22 turns on or off the switching elements SY̶# by manipulating voltages applied to their gates in accordance with the manipulation signals gY̶#.

A temperature sensing diode SD is disposed in the vicinity of the switching elements SY̶# for detecting the temperature in the vicinity the switching elements SY̶# and the diodes DY̶#. This temperature may be referred to as the temperature of the switching elements SY̶# and the diodes DY̶# hereinafter. The output voltage Vsd of the temperature sensing diode SD indicative of the detected temperature is received by a comparator 24. The comparator 24 outputs a fail signal FL to the driver circuit 22 to forcibly turn off the switching elements SY̶# when the output voltage Vsd falls below a threshold voltage Vth. Accordingly, when the temperature of the switching elements SY̶# and the diode DY̶# is excessively high, the switching elements SY̶# are turned off. In this embodiment, the threshold voltage Vth is set to a value of the output voltage Vsd when it corresponds to an allowable highest temperature Tsth. Since the output voltage Vsd of the temperature sensing diode SD and the detected temperature are in a negative correlation, if the output voltage Vsd is lower than the threshold voltage Vth, the switching elements SY̶ are turned off because the detected temperature can be considered to exceed the allowable highest temperature Tsth.

The motor-generator 10 and the inverter 20 are cooled by incompressible coolant 52 as a material exchanging heat with the motor-generator 10 and the inverter 20a supplied by a cooling apparatus. The cooling apparatus circulates the coolant 52 through a cooling channel passing through a radiator 56, the motor-generator 10, the inverter 20 and an intercooler 54, using an electric motor 50. The cooling apparatus has capacity enabling it to keep the temperature of the switching elements SY̶# constituting the inverter 20 below the allowable highest temperature Tsth while the coolant 52 is circulated normally.

The inverter 20 is controlled by the MGECU 40 which is an electronic control unit for controlling the motor-generator 10. The MGECU 40 includes a CPU 42 and a memory 44. The CPU 42 executes programs stored in the memory 44. The MGECU 40 generates the manipulation signals gY̶# to be outputted to the inverter 20 for controlling the torque of the motor-generator 10 at a torque command value Trq*.

The pump 50 is manipulated by a CECU (Control ECU) 59 which is an electronic control unit for controlling flow of the coolant 52. The CECU 59 has a function to receive a detection signal outputted from a temperature sensor 58 for detecting the temperature Tc of the coolant 52 as temperature data for estimating the temperature in the vicinity of the motor-generator 10, and a function to output a drive signal mp to the pump 50. In this embodiment, the temperature sensor 58 is disposed downstream of the radiator 56 and upstream of the motor-generator 10.

An HVECU (Hybrid Vehicle ECU) 60 is an electronic control unit capable of communicating with a man-machine interface including a vehicle-running permission switch (not shown), an accelerator operating member with an accelerator sensor (not shown) and a display panel. The HVECU 60 includes a CPU 62 and a memory 64. The CPU 62 executes programs stored in the memory 64. In this embodiment, the reference potential of the HVECU 60, the MGECU 40 and the CECU 59 is the vehicle potential which is different from the reference potential of the high-voltage battery 30. More specifically, the vehicle potential is set to the middle between the positive and negative potentials of the high-voltage battery 30.

The vehicle-running permission switch is turned on when the user of the vehicle show the user's intention to run the vehicle. The vehicle-running permission switch may be a switch which is turned on when manipulated by the user, or a switch included in a portable device and turned on when the user carrying the portable device approaches the vehicle. The HVECU 60 outputs a ready signal Sr to the MGECU 40 and the CECU 59 when the vehicle-running permission switch is turned on. The CECU 59 starts the pump 50 when triggered by the ready signal Sr. The HVECU 60 starts to manipulate the inverter 20 to control the torque of the motor-generator 10 in accordance with the torque command value Trq* outputted from the HVECU 60 after receiving the ready signal Sr.

The temperature of the coolant 52 in the vicinity of the inverter 20 immediately after the start of circulation of the coolant 52 may exceed its highest maximum temperature in the state where the coolant 52 is circulated steadily.

This is because, if the motor-generator 10 was in a high-load operation just before the vehicle is stopped, the temperature of the coolant 52 in the vicinity of the motor-generator 10 increases by receiving heat from the motor-generator 10 after the vehicle is stopped. That is, if the coolant 52 starts to be circulated far before it is brought to a thermally equilibrium state with the surroundings after the temperature of the coolant 52 in the vicinity of the motor-generator 10 exceeds that in the state where the vehicle is running, the temperature of the inverter 20 increases because the coolant 52 at high temperature passes near the inverter 20.

In this case, if the current flowing through the motor-generator 10 increase, the temperature of the switching element SY̶# may exceed the allowable highest temperature Tsth. Such a situation can be avoided by increasing the capacity of the cooling apparatus (the discharge rate of the pump 50, for example) or by circulating the coolant 52 for a certain period of time after the vehicle is stopped. However, in terms of usage efficiency of the hardware means, it is not expedient to increase the capacity of the hardware means for coping with the above problem which occurs only immediately after the coolant 52 starts to be circulated. Further, circulating the coolant 52 after the vehicle is stopped leads to increase of electric power consumption, and may feel unnatural to the user of the vehicle.

Hence, in this embodiment, the absolute value of the amount of current supply (electric power supply) to the motor-generator 10 is limited within a predetermined value for a certain period of time from the start of circulation of the coolant 52. This makes it possible to prevent excessive increase of the temperature of the switching element SY̶# without upsizing the cooling apparatus. In addition, the effect which such a control process has on the driveability is limited. That is, although the torque of the motor-generator 10 is limited due to limit of current supply, there is low probability that the torque command value Trq* outputted to the motor-generator 10 increase greatly soon after the coolant 52 starts to be circulated.

Figure 2:
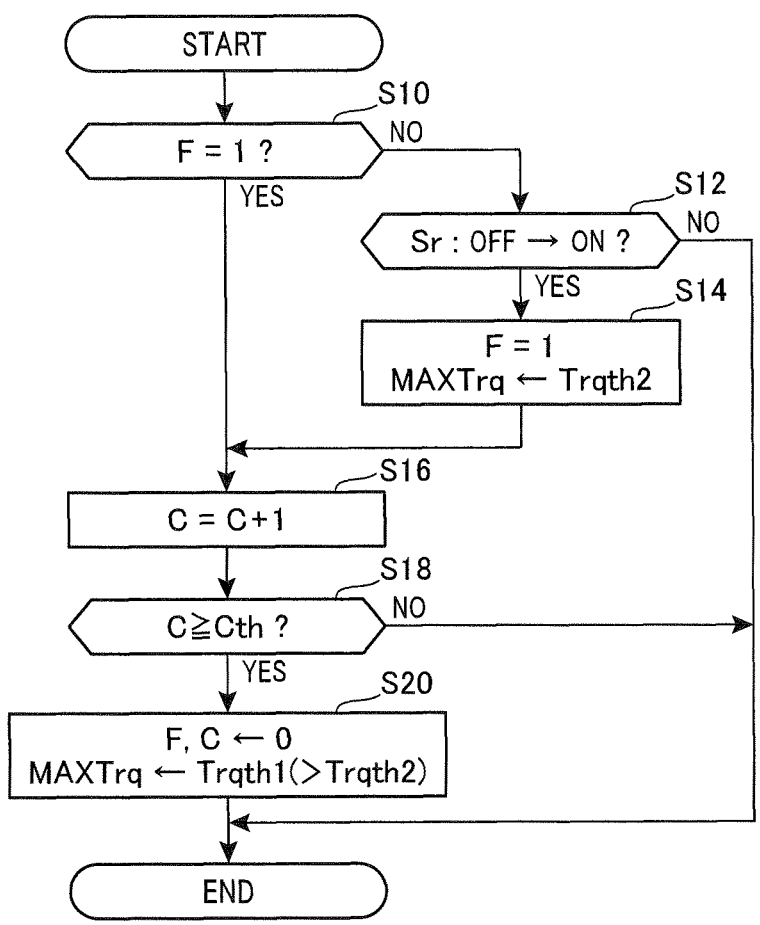
FIG. 2 is a flowchart showing steps of a torque limiting process performed by the control apparatus according to the first embodiment of the invention.

FIG. 2 is a flowchart showing steps of a torque limiting process for the motor-generator 10. This process is performed at regular time intervals by the MGECU 30.

This process begins in step S10 where it is determined whether a flag F is 1 or not. If the flag F is 1, it means that the torque limiting process is in operation. If the determination result in step S10 is negative, the process proceeds to step S12 where it is determined whether the ready signal Sr has been changed to ON. Step S12 is for determining whether circulation of the coolant 52 has been started or not. If the determination result in step S12 is affirmative, the process proceeds to step S14 to change the flag F to 1, and set a torque guard value MAXtrq* to a start-time limit value Trqth2 to guard the torque command value Trq* received from the HVECU 60.

Figure 3:
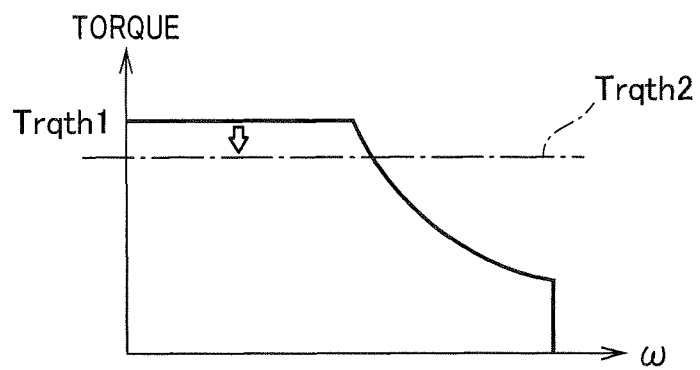
FIG. 3 is a diagram explaining the torque limitation in the drive system shown in FIG. 1.

As shown in FIG. 3, the start-time limit value Trqth2 is smaller than a steady-time limit value Trqth1 which is a limit value of the torque command value Trq* used when the coolant 52 circulates steadily. While the torque command value Trq* is guarded by the start-time limit value Trqth2, the amount of current supply to the motor-generator 10 is more limited and accordingly the currents supplied to the switching elements SY# and the diodes DY# constituting the inverter 20 are more limited than while the torque command value Trq* is guarded by the steady-time limit value Trqth1. This makes it possible to reduce the conduction loss of the switching elements SY# and the diodes DY#, and the switching loss of the switching elements SY#. As shown in FIG. 3, the torque of the motor-generator 10 is equal to the guard value in the range where the electric angular velocity omega of the motor-generator 10 is lower than a certain value, however, decreases gradually with the increase of the electric angular velocity omega in the range above the certain value. This is because, since the induced voltage of the motor-generator 10 increases with the increase of the electric angular velocity omega, the torque of the motor-generator 10 decreases with the increase of the electric angular velocity omega for the same input voltage of the inverter 20.

Incidentally, the torque limiting process by the start-time limit value Trqth2 can be performed by writing the start-time limit value Trqth2 into the torque guard value MAXtrq* which may be implemented as a variable. Alternatively, the torque limiting process may be performed using a map defining the relationship between the electric angular velocity omega and the torque guard value MAXtrq* when the torque guard value MAXtrq* should be guarded by the start-time limit value Trqth2, and a map defining the relationship between the electric angular velocity omega and the torque guard value MAXtrq* when the torque guard value MAXtrq* should be guarded by the steady-time limit value Trqth1.

When step S14 is completed, or the determination result in step S10 is affirmative, the process proceeds to step S16. In step S16, a counter C for clocking the period of time elapsed from when the torque limiting process is started is incremented. In subsequent step S18, it is determined whether or not the count value of the counter C is larger than or equal to a threshold value Cth. Step S18 is for determining whether a condition to terminate the torque limiting process has been satisfied. The threshold value Cth is set to a value corresponding to a time beyond which the temperature of the switching element SY# and the diodes DY# is assumed not to exceed a threshold temperature Thereafter the torque limiting process is terminated. Preferably, this time is set shorter than 15 seconds, and more preferably, set shorter than 10 seconds. Further, this time is set longer than 3 seconds preferably, and more preferably, set longer than 5 seconds.

If the determination result in step S18 is affirmative, the process proceeds to step S20 where the flag F and the counter C are initialized, and the torque guard value MAXTrq is changed to the steady-time limit value Trqth1.

When step S20 is completed, or steps S10 or S18 is completed, the process is terminated.

Next, advantages of the above described embodiment are explained with reference to FIG. 4.

Figure 4:
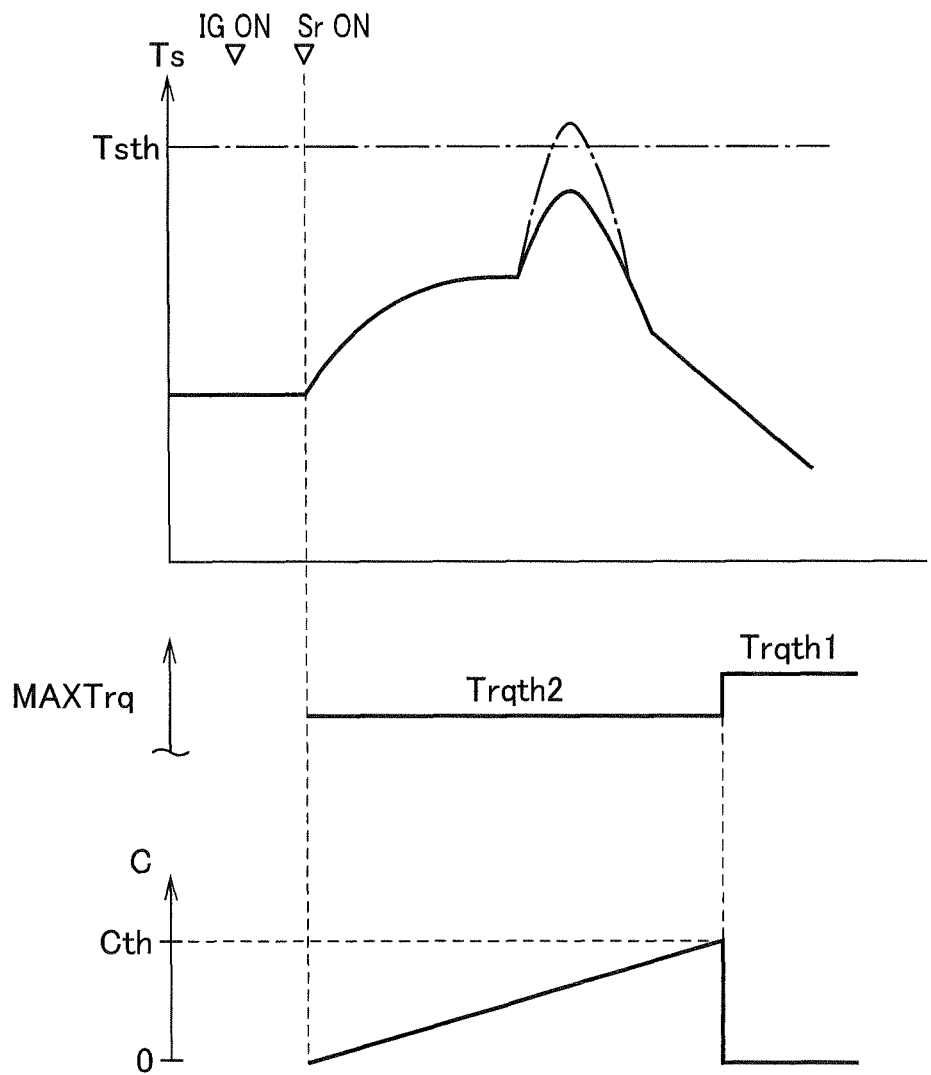
FIG. 4 is a diagram explaining advantages effects provided by the control apparatus according to the first embodiment of the invention.

As shown in FIG. 4, circulation of the coolant 52 starts at the time when the ready signal Sr is turned on after the vehicle-running permission switch is turned on (IGON in FIG. 4). As a result, the temperature Ts of the switching elements SY# and the diodes DY# increases due to heat received from the coolant 52 in the vicinity of the motor-generator 10. However, since the torque guard value MAXTrq has been set to the start-time limit value Trqth2 to suppress heat generation of the switching elements SY# and the diodes DY#, the temperature Ts can be prevented from reaching the allowable highest temperature Tsth as shown by the solid line in FIG. 4. On the other hand, if the torque guard value MAXTrq is set to the steady-time limit value Trqth1 from the start of circulation of the coolant 52, the temperature Ts exceeds the allowable highest temperature Tsth as shown by the chain line in FIG. 4.

As described above, according to the first embodiment, it is possible to prevent the temperature of the switching elements SY# and the diodes DY# from excessively increasing without upsizing the cooling apparatus by limiting the torque of the motor-generator 10 for a certain period of time from the start of circulation of the coolant 52. Since limiting the torque of the motor-generator 10 is performed each time the coolant 52 starts to be circulated, the control process therefor is simple. In addition, complicated communication between the inverter 20 and the MGECU 40 is not required. In contrast, if limiting of the torque were performed in accordance with the detection value of the temperature sensing diode SD, some hardware including insulated communication means such as photocouplers for sending the detection value to the MGECU 40 would be required.

Second Embodiment

Next, a second embodiment of the invention is described with a focus on difference with the first embodiment.

In the following, components which are the same as those of the first embodiment are given the same reference numerals or characters.

Figure 5:
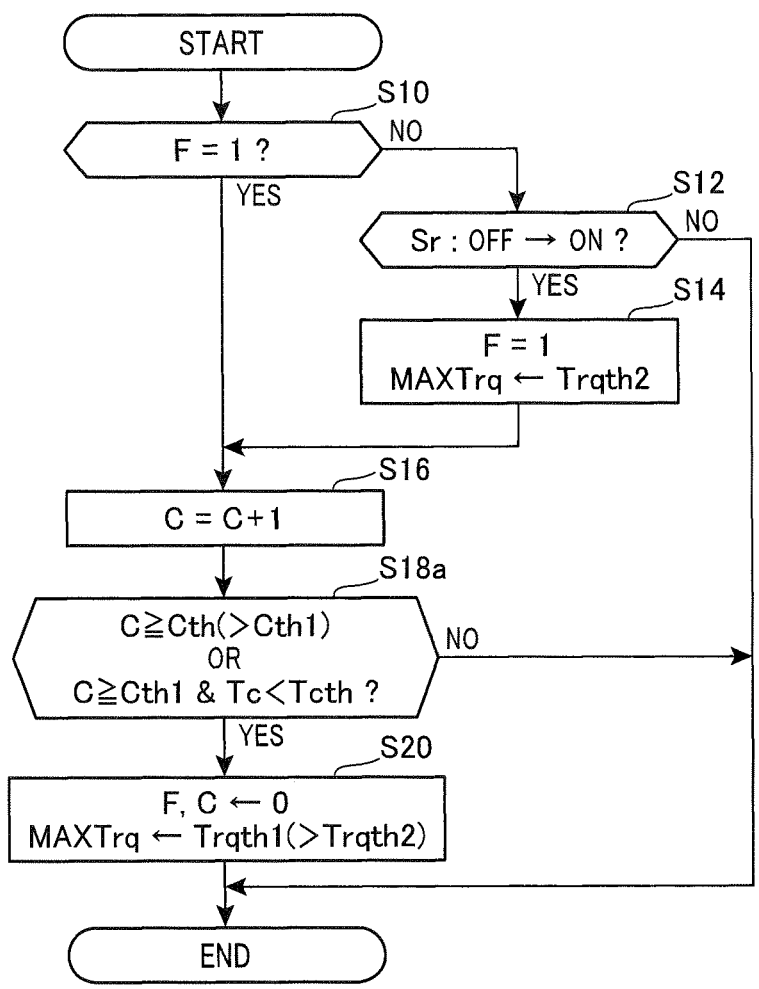
FIG. 5 is a flowchart showing steps of a torque limiting process performed by a control apparatus according to a second embodiment of the invention.

FIG. 5 is a flowchart showing steps of the torque limiting process performed by a control apparatus according to the second embodiment of the invention. This process is performed at regular time intervals by the MGECU 40. In FIG. 5, the same steps as those in FIG. 2 are indicated by the same step numbers.

In the second embodiment, as shown in step S18a, the condition to terminate the torque limiting process is that the logical sum of the following conditions (A) and (B) is true. (A) The count value of the counter C is larger than or equal to the threshold value Cth. (B) The count value of the counter C is larger than or equal to a pre-threshold value Cth1 which is smaller than the threshold value Cth, and the temperature Tc of the coolant 52 is lower than a threshold temperature Tcth. The reason why the condition (B) is provided is to terminate the torque limiting process early if the temperature Tc of the coolant 52 is sufficiently low. Incidentally, the reason why the condition (B) includes a lapse of time corresponding to the pre-threshold value Cth1 is that there is a time gap between the timing when the temperature near the temperature sensor 58 rises due to heat of the coolant 52 present in the vicinity of the temperature sensor 58 at the time when the motor-generator 10 stopped operation and the timing when the coolant 52 starts to be circulated.

Third Embodiment

Next, a third embodiment of the invention is described with a focus on difference with the first embodiment.

Figure 6:
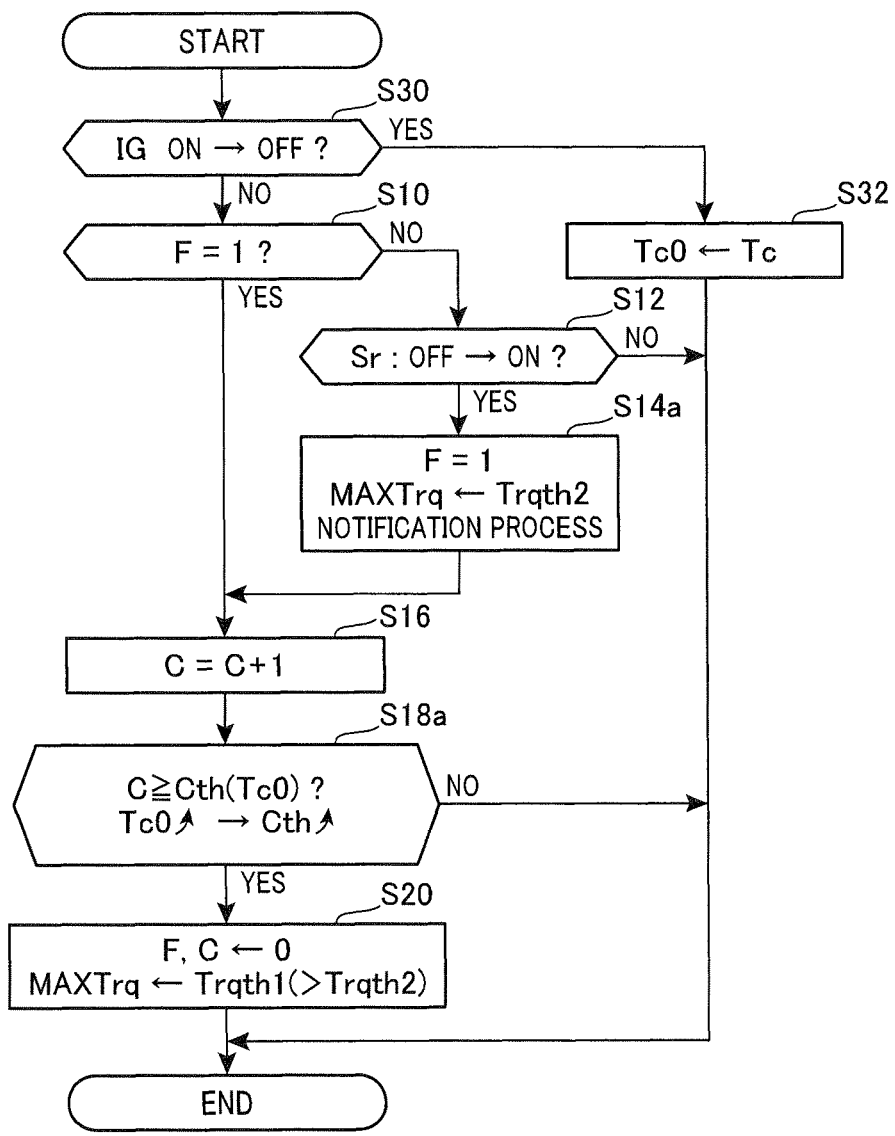
FIG. 6 is a flowchart showing steps of a torque limiting process performed by a control apparatus according to a third embodiment of the invention.

FIG. 6 is a flowchart showing steps of the torque limiting process performed by a control apparatus according to the third embodiment of the invention. This process is performed at regular time intervals by the MGECU 40. In FIG. 6, the same steps as those in FIG. 2 are indicated by the same step numbers.

This process begins in step S30 where it is determined whether or not the vehicle-running permission switch (IG in FIG. 6) has been changed from on to off. If the determination result in step S30 is affirmative, the process proceeds to step S32 where the temperature Tc of the coolant 52 detected at this moment is stored in the memory 44 as a stop-time temperature Tc0. Preferably, the memory 44 is a nonvolatile memory capable of keeping data stored therein without any power supply. Alternatively, the memory 44 may be a backup RAM supplied with power regardless of whether the MGECU 40 is in operation or not. Still alternatively, the temperature Tc may be stored in a memory of the HVECU 60 instead of the memory 44, or may be stored in both of them.

On the other hand, if the determination result in step S30 is negative, the process performs step S10 and the steps following step S10. However, in step S18a, the threshold value Cth is set to a value which increases with the increase of the stop-time temperature Tc0. This is because, with the increase of the stop-time temperature Tc0, the probability that the temperature of the coolant 52 in the vicinity of the motor-generator 10 is considerably high at the start of circulation becomes higher, and the time necessary to resolve the potential problem that the temperature in the vicinity of the inverter 20 may exceed an allowable temperature becomes longer.

As described above, according to the third embodiment, it is possible to reduce the period of time for which the torque limiting process has to be performed without causing the temperature of the inverter 20 to excessively increase by setting the threshold value Cth to a smaller value when the temperature of the coolant 52 in the vicinity of the motor-generator 10 is assumed to be sufficiently low based on the stop-time temperature Tc0.

Fourth Embodiment

Next, a fourth embodiment of the invention is described with a focus on difference with the first embodiment.

In the fourth embodiment, a step for determining whether the torque limiting process should be performed is additionally included in the torque limiting process itself.

Figure 7:
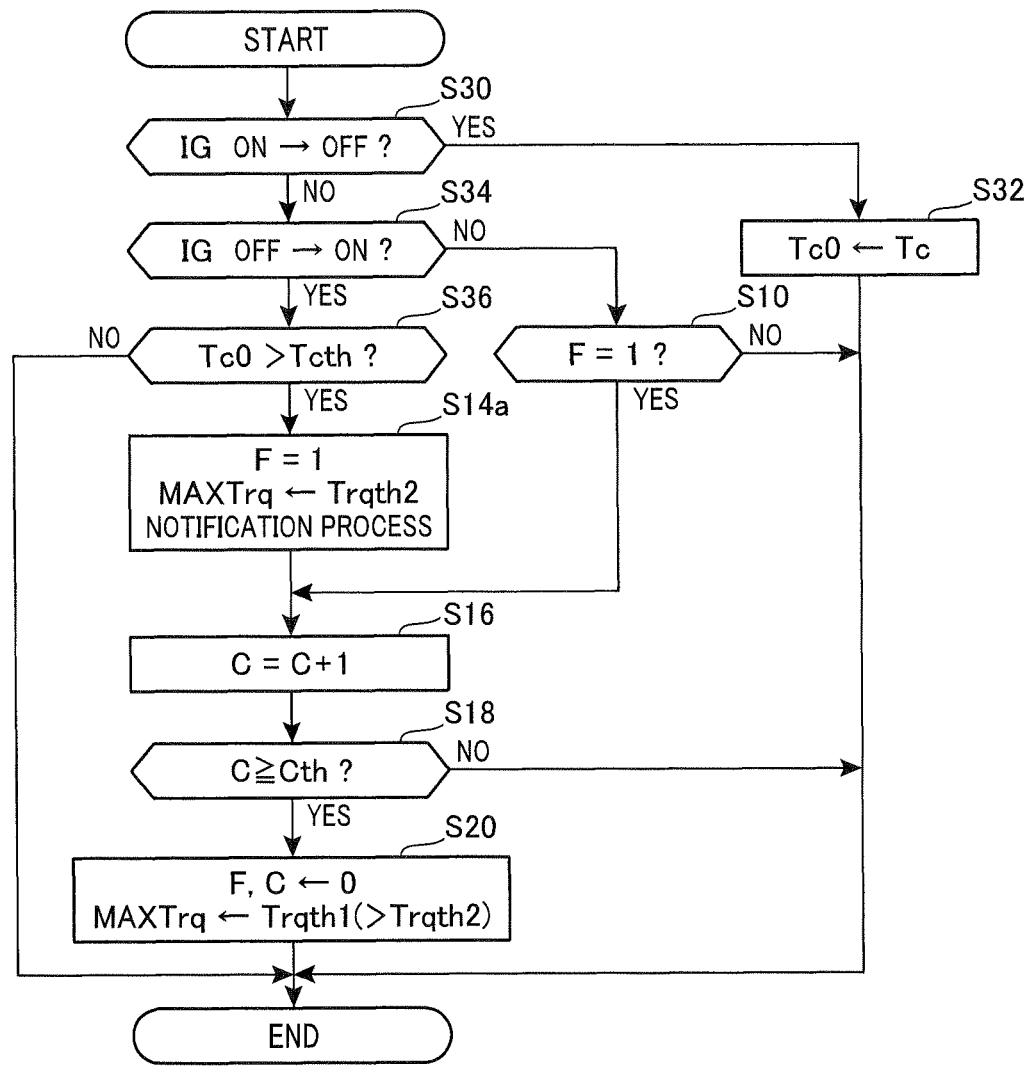
FIG. 7 is a flowchart showing steps of a torque limiting process performed by a control apparatus according to a fourth embodiment of the invention.

FIG. 7 is a flowchart showing steps of the torque limiting process performed by a control apparatus according to the fourth embodiment of the invention. This process is performed at regular time intervals by the MGECU 40. In FIG. 7, the same steps as those in FIG. 2 are indicated by the same step numbers.

In the fourth embodiment, like in the third embodiment, the temperature Tc of the coolant 52 detected at the time when it is determined that the vehicle-running permission switch has been changed from on to off is stored as the stop-time temperature Tc0 in steps S30 and S32. On the other hand, if the determination result in step S30 is negative, the process proceeds to step S34 where it is determined whether or not the vehicle-running permission switch has been changed from off to on. Step S34 is for detecting the timing when circulation of the coolant 52 is started. If the determination result in step S34 is affirmative, the process proceeds to step S36.

In step S36, it is determined whether or not the stop-time temperature Tc0 is higher than the threshold temperature Tcth. Step S36 is for determining whether the torque limiting process should be performed or not. When the stop-time temperature Tc0 is sufficiently low, since the temperature of the coolant 52 in the vicinity of the motor-generator 10 is also sufficiently low, the torque limiting process is not performed. The threshold temperature Tcth is set to such a temperature that the torque limiting process is necessary to be performed when the time from when the stop-time temperature Tc0 is acquired to when the vehicle-running switch is turned on again is short.

If the determination result in step S36 is affirmative, the process proceeds to step S14a. In step S14a, the flag F is set to 1, the torque guard value MAXTrq is set to the start-time limit value Trqth2, and notification that the torque limiting is being performed is given to the user. In this embodiment, the notification is performed such that a signal SI indicative of the torque limiting process being started is outputted from the MGECU 40 to the HVECU 60, and the HVECU 60 displays that the torque limiting process is in operation in the instrument panel or the like. Step S14a is provided from the viewpoint that the operation of the torque limiting process may feel unnatural to the user.

When step S14a is completed, or if the determination result in step S10 is affirmative, the process performs step S16 and the steps following step S16. It should be noted that the threshold value Cth used in step S18 is set taking into account the time gap between when the vehicle-running permission switch is turned and when the coolant 52 starts to be circulated in response to the output of the ready signal Sr.

Fifth Embodiment

Next, a fifth embodiment of the invention is described with a focus on difference with the fourth embodiment.

Also in the fifth embodiment, a step for determining whether the torque limiting process should be performed is additionally included in the torque limiting process itself.

FIG. 8 is a flowchart showing steps of the torque limiting process performed by a control apparatus according to the fifth embodiment of the invention. This process is performed at regular time intervals by the MGECU 40. In FIG. 8, the same steps as those in FIG. 7 are indicated by the same step numbers.

In this embodiment, the condition to perform the torque limiting process is that the difference between the stop-time temperature Tc0 and the current temperature Tc is smaller than a threshold difference $\Delta$Tcth as shown in step S36a. Step S36a is provided from a view point that, if this difference is large, the time that has elapsed from the stop of circulation of the coolant 52 can be assumed to be long. If the elapsed time is long, since the coolant 52 in the vicinity of the motor-generator 10 is brought to a thermally equilibrium state with the surroundings, and its temperature falls sufficiently, it becomes unnecessary to perform the torque limiting process.

Sixth Embodiment

Next, a sixth embodiment of the invention is described with a focus on difference with the first embodiment.

In the system shown in FIG. 1, the reason why the torque command value Trq* increases immediately after the start of circulation of the coolant 52 is that a start command to start the engine 16 occurs in response to increase of the required driving power of the vehicle when the vehicle starts moving. That is, for the vehicle to start moving, the motor-generator 10 has to output power to drive the drive wheels 14 and also power to start the engine 16.

Accordingly, in this embodiment, the engine 16 is started before the vehicle starts moving (before the clutch C1 is engaged) if the torque limiting process is determined necessary to be performed based on the temperature of the coolant 52. This makes it possible to limit the output power of the motor-generator 10.

FIG. 9 is a flowchart showing steps of the torque limiting process performed by a control apparatus according to the sixth embodiment of the invention. This process is performed at regular time intervals by the HVECU 60.

This process begins in step S40 where it is determined whether or not the vehicle-running permission switch has been changed from off to on. Step S40 is for determining whether it is time just to start circulation of the coolant 52. If the determination result in step S40 is affirmative, the process proceeds to step S42 to determine whether or not the temperature To of the lubricating oil of the transmission 12 exceeds a threshold temperature Toth. The temperature To of the lubricating oil of the transmission 12 is a parameter having a correlation with the temperature of the coolant 52 in the vicinity of the motor-generator 10. Step S42 is for determining whether the temperature of the coolant 52 in the vicinity of the motor-generator 10 is excessively high or not. The threshold temperature Toth is set to the lowest temperature above which the torque limiting is not necessary to be performed.

If the determination result in step S42 is affirmative, the process proceeds to step S44 to start the motor-generator 10 for applying torque to the engine 16 to start the engine 16. In the sixth embodiment, the torque needed to start the engine 16 is assumed to be smaller than the start-time limit value Trhth2 shown in FIG. 3. Accordingly, by engaging the clutch C1 in step S46 after the engine 16 is started, the power of the engine 16 is transmitted to the drive wheels 14. From then on, the torque command value Trq* of the motor-generator 10 is set to the power necessary to run the vehicle minus the power required to engine 16. Accordingly, even if the torque guard value MAXtrq is always set to the steady-time limit value Trqth1, the torque is limited when there is a possibility that the temperature of the coolant 52 in the vicinity of the inverter 20 becomes excessively high.

According to the sixth embodiment configured to perform the torque limiting process in the way described above, it is possible to avoid a situation where the power to be supplied to the drive wheels 14 is restricted by restriction of supply of electric power.

Other Embodiments

It is a matter of course that various modifications can be made to the above described embodiments as described below.

Regarding the means for terminating the torque limiting process:

In the second embodiment, the condition to terminate the torque limiting process may include that, instead of the temperature Tc of the coolant 52, the temperature of the switching elements S¥# is lower than a threshold temperature. Further, the condition to terminate the torque limiting process may be that each or at least one of the temperatures of the coolant 52 and the switching elements S¥# is lower than the threshold temperature. The temperature of the switching elements S¥# can be acquired by PWM modulating the temperature detected by the temperature sensing diode SD shown in FIG. 1 and transmitting it through an insulated communication means such as photocouplers.

In the second embodiment, the condition to terminate the torque limiting process may optionally not include that the count value of the counter C is larger than or equal to the threshold value Cth.

Regarding the torque limiting means:

The start-time limit value Trqth2 may not be a fixed value. For example, when the switching frequency is changed in accordance with the electric angular velocity omega, the start-time limit value Trqth2 may be varied depending on the electric angular velocity omega. This is because the amount of heat generation per unit time of the switching elements S¥# varies depending on the switching frequency. For another example, the start-time limit value Trqth2 may be a value which decreases with the increase of the temperature of the coolant 52 in the vicinity of the motor-generator 10 at the start of circulation of the coolant 52. In this case, the maximum of the start-time limit value Trqth2 may be set smaller than the steady-time limit value Trqth1.

The torque limiting means is not limited to the one that allows the motor-generator 10 to output torque larger than zero but smaller than a certain value. For example, the torque limiting process may be performed by inhibiting supply of current to the motor-generator 10. However, in this case, it is preferable to perform the torque limiting process only when the temperature of the coolant 52 in the vicinity of the motor-generator 10 at the start of circulation of the coolant 52 is high, as in the case of the fourth embodiment.

Regarding the parameter as an object to be limited:

The parameter is not limited to the torque command value Trq*. For example, it may be the current supplied to the motor-generator 10. In this case, torque limiting can be performed by setting command currents id* and iq* in accordance with the torque command value Trq*, performing current feedback control to feedback-control the actual currents id and iq at the command currents id* and iq*, respectively, and performing a guard process for the command currents id* and iq*.

Further, when the command currents id* and iq* are set to values for performing minimum-current/maximum torque control in a low speed range, the amount of current supply may be limited in a high speed range where the minimum-current/maximum torque control cannot be performed depending on the input voltage of the inverter 20 at the start of circulation of the coolant 52. This is because the currents flowing through the switching elements S¥# and the diodes D¥# are larger when field weakening control is performed than when the minimum-current/maximum torque control is performed for outputting the same torque. That is, the output torque is more limited when the coolant 52 starts to be circulated even if it is smaller than the start-time limit value Trqth2 than when the coolant is being circulated steadily after a lapse of a predetermined time.

Regarding the acquiring means:

In the fourth embodiment, the temperature acquiring means may acquire the temperature of the switching elements S¥# immediately after the vehicle-running permission switch is turned off, instead of the temperature of the coolant 52 immediately after the vehicle-running permission switch is turned off. The temperature of the switching elements S¥# may be acquired in the similar way as described in "Regarding the means for terminating the torque limiting process". Further, in the fourth embodiment, the temperature Tc of the lubricating oil of the transmission 12 immediately after turning on of the vehicle-running permission switch (immediately before the start of circulation of the coolant) may be used as in the case of the sixth embodiment.

In the fifth embodiment, the acquiring means may acquire change of the temperature of the switching elements S¥# instead of change of the temperature Tc0 of the coolant 52 between immediately after turning on of the vehicle-running permission switch and immediately after turning on of the vehicle-running permission switch thereafter. Further, in the fifth embodiment, the temperature Tc of the lubricating oil of the transmission 12 immediately after turning on of the vehicle-running permission switch (immediately before the start of circulation of the coolant) may be used as in the case of the sixth embodiment.

In the sixth embodiment, the acquiring means may acquire the temperature Tc0 of the coolant 52 or the temperature of the switching elements S¥# instead of the temperature Tc of the lubricating oil of the transmission 12. Alternatively, the acquiring means may acquire the temperature Tc0 of the coolant 52 immediately after turning off of the vehicle-running permission switch as in the case of fourth embodiment, or change of the temperature Tc0 of the coolant 52 between immediately after turning off of the vehicle-running permission switch and immediately after turning on of the vehicle-running permission switch thereafter as in the case of the fifth embodiment.

Further, if there is provided a means for measuring the period of time in which a connection means (a relay, for example) for making connection between the inverter 20 and the high-voltage battery 30 is open, means for acquiring the measured time may be used instead of the temperature acquiring means.

Regarding the threshold value changing means:

The threshold value Cth used in the second, fourth and fifth embodiments may be varied in the same way as described in the third embodiment.

In this case, the minimum of the threshold value may be larger than 0.

Regarding the inhibition means:

In the fifth embodiment, the inhibition means may be such that it inhibits the torque limiting process when the logical sum of a condition that the difference between the temperatures Tc0 and Tc is larger than or equal to the threshold value ΔTcth and a condition that the stop-time temperature Tc0 is lower than the threshold temperature Tcth is true.

In this case, the start-time limit value Trqth2 may be varied, and its maximum may be set to the steady-time limit value Trqth1 as described in "Regarding the torque limiting means". Further, in this case, the threshold value Cth may be varied and its minimum may be zero as described in "Regarding the threshold value changing means".

Regarding the structure of the cooling apparatus:

The inverter 20 may be disposed upstream of the motor-generator 10.

The intercooler 54 may be omitted. The coolant 52 may cool components other than the motor-generator 10 and the inverter 20. For example, the coolant 20 may cool also the cylinder block of the engine 16.

Regarding the notification process of the torque limiting process:

The notification process may not be performed in the fourth and fifth embodiments. The notification process may be performed in the first, second and third embodiments.

In the above embodiments, the hybrid vehicle is a parallel hybrid vehicle. However, the hybrid vehicle may be a series hybrid vehicle or a parallel/series hybrid vehicle. Also in these cases, the torque limiting means as described in the first to fifth embodiments and the engine starting means as described in the sixth embodiment can be advantageously used. Further, the present invention can be used also for an electric vehicle including, as an energy storage means for its main engine, only an electricity storage means (a fuel cell, for example). Also in this case, the torque limiting means as described in the first to fifth embodiment can be advantageously used.

In the above embodiments, the electric rotating machine is an IPMSM. However, the electric rotating machine does not necessarily have to be an IPSM. Further, the electric rotating machine may be an induction machine.

The reference potential of the inverter 20 and the high-voltage battery 30 may be the same as that of the control apparatus such as the MGECU 40.

The above explained preferred embodiments are exemplary of the invention of the present application which is described solely by the claims appended below. It should be understood that modifications of the preferred embodiments may be made as would occur to one of skill in the art.

What is claimed is:

1. A control apparatus for an electric rotating machine which is mounted as an engine on a vehicle together with a power conversion circuit to be connected to the electric rotating machine, and a cooling apparatus for circulating coolant to the electric rotating machine and the power conversion circuit through a circulation channel, comprising:
a limiting means for performing a limiting operation to limit an amount of electric power supply from the inverter to the electric rotating machine each time a circulation starting timing of the coolant comes; and
a terminating means for terminating the limiting operation after a lapse of a predefined period from start of the limiting operation.

2. The control apparatus for an electric rotating machine according to claim 1, wherein the limiting means is configured to limit an absolute value of the amount of electric power supply within a predetermined value larger than zero.

3. The control apparatus for an electric rotating machine according to claim 1, wherein the predefined period is a predetermined length of time.

4. The control apparatus according to claim 1, wherein the predefined period corresponds to a period necessary to elapse for a temperature of at least one of a temperature of switching elements of the power conversion circuit and a temperature of a material exchanging heat with the switching elements to fall below a threshold temperature after a lapse of a predetermined time from the circulation starting timing.

5. The control apparatus for an electric rotating machine according to claim 1, further comprising an acquiring means for acquiring temperature data indicative of a temperature of the coolant in the vicinity of the electric rotating machine at the circulation starting timing,
the terminating means including a changing means for changing a length of the predefined period in accordance with the temperature of the coolant in the vicinity of the electric rotating machine.

6. The control apparatus for an electric rotating machine according to claim 1, wherein the limiting means is configured to limit an output torque of the electric rotating machine each time the circulation starting timing comes.

7. The control apparatus for an electric rotating machine according to claim 1, further comprising an acquiring means for acquiring temperature data for estimating a temperature in the vicinity the electric rotating machine,
the limiting means including an inhibiting means for inhibiting the limiting means from performing the limiting operation even when the circulation starting timing comes when the estimated temperature is below a predetermined temperature.

8. The control apparatus for an electric rotating machine according to claim 7, wherein the acquiring means acquires, as the temperature data, data indicative of a temperature of the coolant in the vicinity of the electric rotating machine.

9. The control apparatus according to claim 7, wherein the acquiring means is configured to acquire, as the temperature data, a temperature of switching elements of the power conversion circuit or a temperature of a material exchanging heat with the switching elements when the vehicle was stopped most recently.

10. The control apparatus according to claim 7, wherein the acquiring means is configured to acquire, as the temperature data, a difference of a temperature of switching elements of the power conversion circuit or a temperature of a material exchanging heat with the switching elements between when the vehicle was stopped most recently and when the circulation starting timing comes.

11. The control apparatus according to claim 1, wherein
the vehicle has an internal combustion engine as another main engine of the vehicle,
the control apparatus further comprising an acquiring means for acquiring temperature data of the coolant in the vicinity of the electric rotating machine at the circulation starting timing of the coolant, and an engine starting means for starting the internal combustion engine upon determining that the temperature in the vicinity of the electric rotating machine is higher than a predetermined temperature based on the acquired temperature data,
the limiting means being configured to determine an output power of each of the internal combustion engine and the electric rotating machine in accordance with power necessary to run the vehicle.

* * * * *